Oct. 18, 1955    B. B. JOHNSON    2,721,233
AUTOMATIC TELECOMMUNICATION EXCHANGE SYSTEMS
Filed March 23, 1953    6 Sheets-Sheet 1
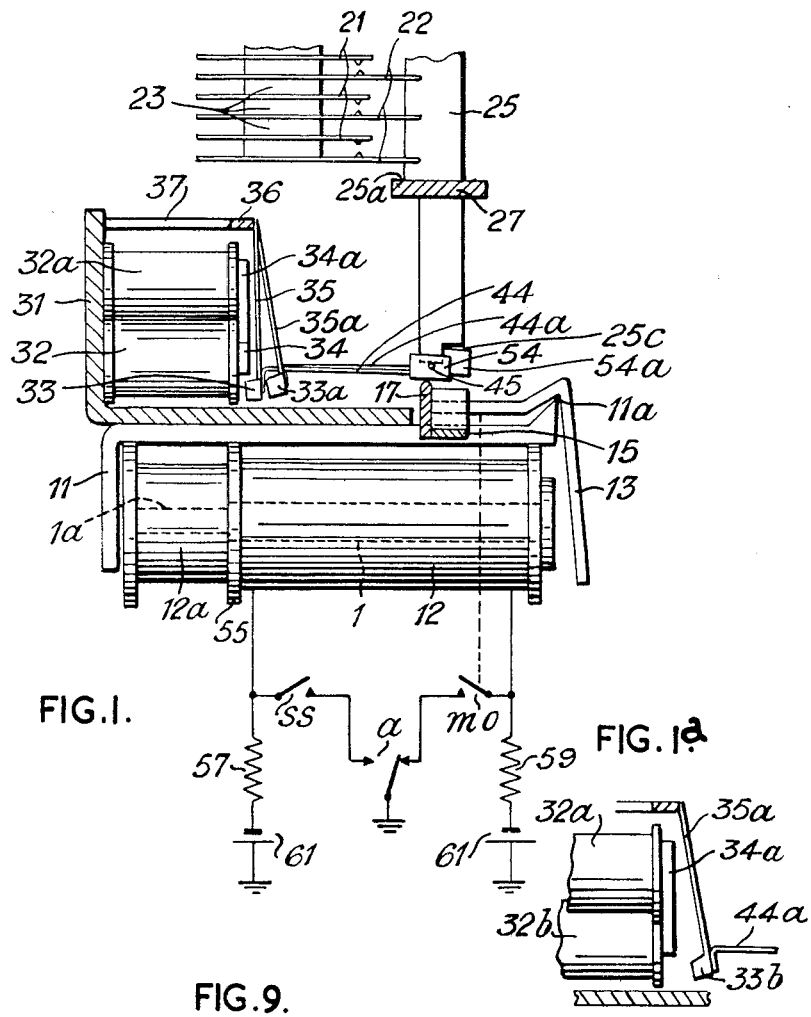
FIG.1.   FIG.1a.
FIG.9.
| PUSH BUTTONS | 1ST PUSH | 2ND PUSH |
|---|---|---|
| 1 | X Z | X Z |
| 2 | X | X |
| 3 | Y | Y |
| 4 | Y Z | Y Z |
| 5 | X Y Z | |
NUMBERING ARRANGEMENT   FIG.10.
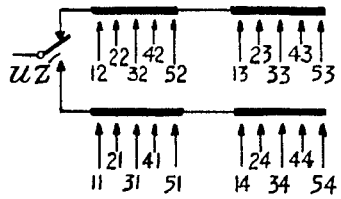
Inventor:
Benjamin Bertie Johnson
attorneys:
Baldwin & Wight Oct. 18, 1955     B. B. JOHNSON     2,721,233
AUTOMATIC TELECOMMUNICATION EXCHANGE SYSTEMS
Filed March 23, 1953     6 Sheets-Sheet 2
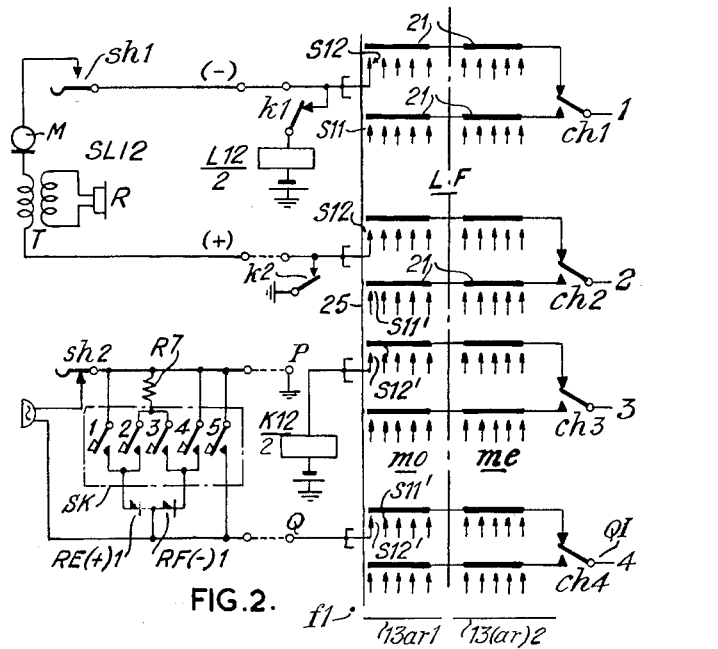
FIG. 2.
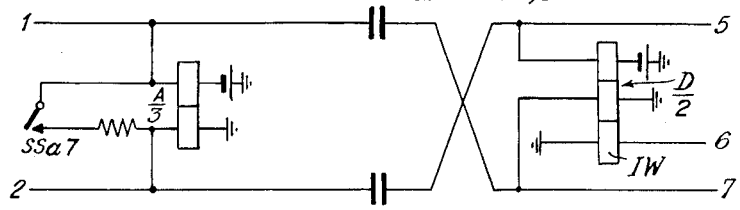
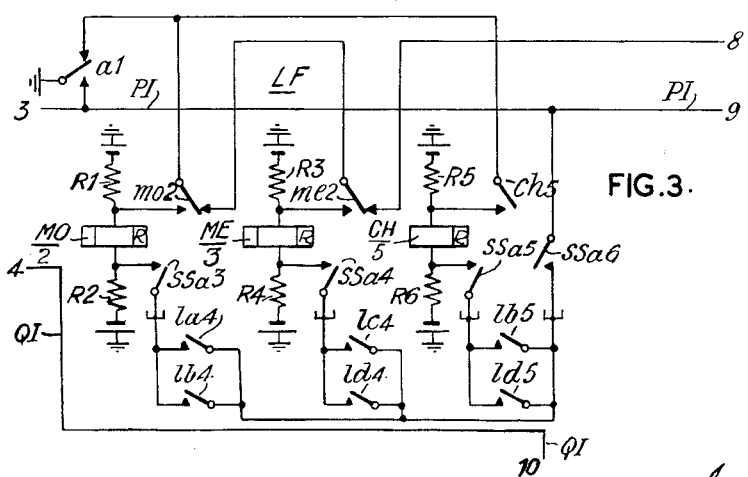
FIG. 3.
Inventor:
Benjamin Bertie Johnson
Attorneys:
Baldwin & Wight Oct. 18, 1955  B. B. JOHNSON  2,721,233
AUTOMATIC TELECOMMUNICATION EXCHANGE SYSTEMS
Filed March 23, 1953  6 Sheets-Sheet 3

Inventor:
Benjamin Bertie Johnson
Attorneys:
Baldwin & Wight

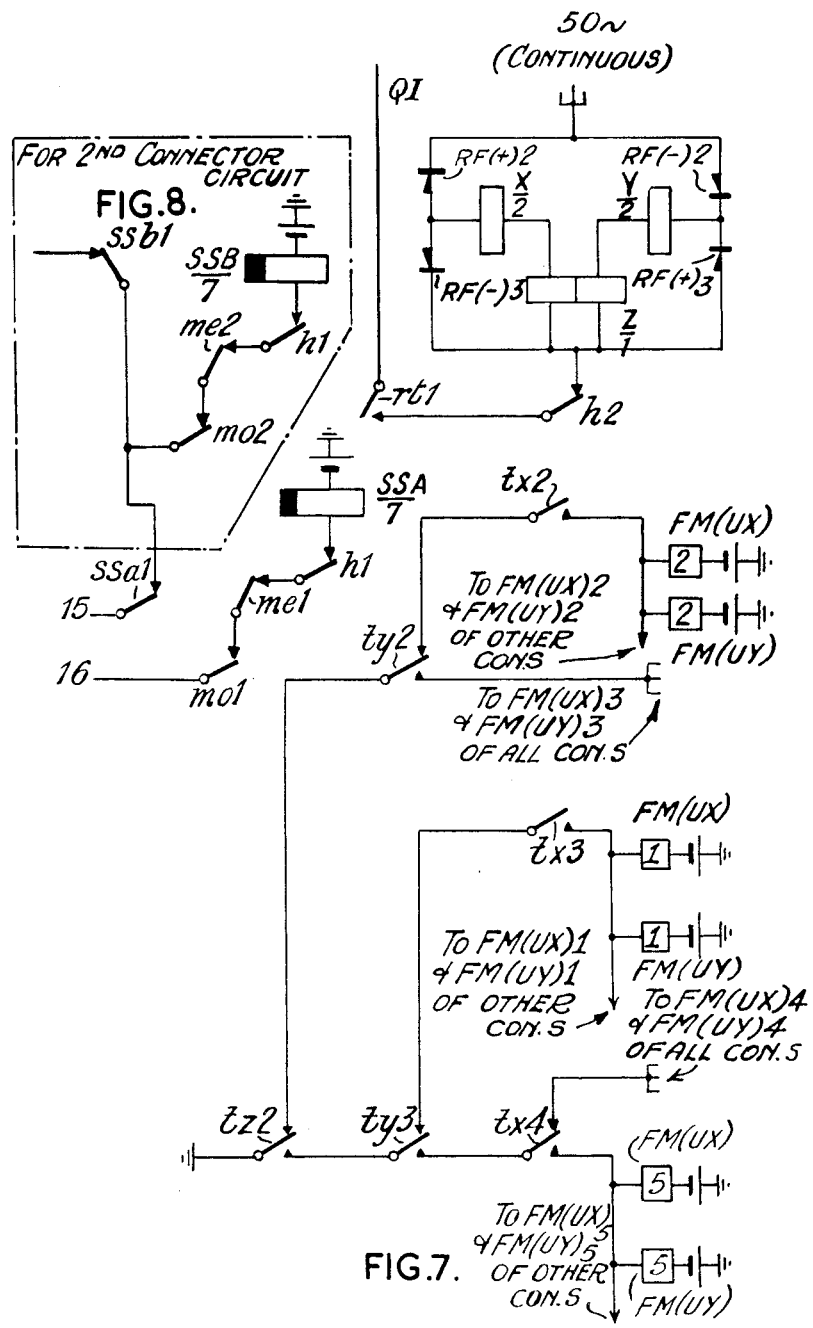

United States Patent Office 2,721,233
Patented Oct. 18, 1955

2,721,233

AUTOMATIC TELECOMMUNICATION EXCHANGE SYSTEMS

Benjamin Bertie Johnson, Streatham, London, England, assignor to Telephone Manufacturing Company Limited, London, England, a British company Application March 23, 1953, Serial No. 344,150

Claims priority, application Great Britain March 28, 1952

21 Claims. (Cl. 179—18)

This invention relates to automatic telecommunication exchange systems, and particularly to such systems in which connections are established between calling and called lines by means of what may be regarded as relays in which the relay armature can operate only such of its contacts as have been selected by the interposition of a member (finger) between the said armature and the said contacts or an operating bar for the contacts. A relay of this kind, hereinafter known as a selective relay unit, may, for the purpose of the present description, be said to consist of an electro-magnetic relay having a plurality of banks of contacts with a like plurality of finger magnets, as defined below, for determining which bank of contacts shall be operated upon by the relay armature when the operating electro-magnet is energised. A finger magnet is an electro-magnet which, when energised, operates upon a finger so as to interpose said finger between an operating bar for the bank of contacts with which the finger magnet is associated and the armature of the selective relay unit.

There may be a plurality of such selective relay units associated together to constitute a selector switch (for example a line finder or a connector) each having its own individual plurality of finger magnets, corresponding finger magnets of associated selective relay units being connected into a common electric circuit for simultaneous operation. Alternatively, there may be a plurality of such relays associated together to constitute a selector switch with only one plurality of finger magnets common to all the relays of the plurality, each finger magnet operating upon a bar so as to interpose a finger between corresponding banks of contacts of all associated relays and the armature of each such relay. The former of these two arrangements is an electrical equivalent of the latter which latter will be recognised as a cross-bar switch.

Whether the relays are the component of a cross-bar switch or are selective relays of the kind in which each has its own individual plurality of finger magnets and constituting the component parts of the electrical equivalent of a cross-bar switch they will for convenience be hereinafter referred to as selective relay units, and for the avoidance of the tautological use of the term "selective relay unit(s)" the symbol SRU or SRU's will, from time to time, be used in the following description.

A selector (such as a line finder or connector) may consist of one SRU for connecting any one of a plurality of lines (such as subscribers' lines in a telephone system) to a connecting line (such as a trunk in a telephone system), or such a selector may consist of a plurality of SRU's for connecting any one of a plurality of first lines (subscribers' lines) to any one of a plurality of second lines (trunks) one trunk to each SRU, or such selector may consist of a plurality of SRU's for connecting any one of a plurality of subscribers' lines to a particular trunk which may be common to a number of SRU's.

Each bank of contacts on the SRU or SRU's may serve to connect more than one subscriber's line to the trunk which is associated with it, in which case switching means associated with the trunk may be provided for differentiating between the several subscribers' lines.

The invention finds particular use in small automatic telephonic exchange systems such as those installed in office blocks, though it is not to be considered as limited to such systems. In such office installations, an important requirement is that current consumption shall be low.

In most cross-bar switches, and their electrical equivalents as above outlined, the SRU's, when energised, have to be held energised electrically as long as an established connection is required to persist. This is because operation of a selected bank of contacts is, as has been indicated above, effected by interposition of a finger between said bank of contacts and, the armature and subsequent operation of the said armature, of the SRU, and maintenance of the bank of contacts in its operated condition depends upon persistence of this condition. Release of the finger and restoration of the bank contacts is effected by release of the operated armature. It has, however, been proposed to hold contacts, once operated, in their operated condition, for so long as may be required, by mechanical latching means which are independent of persistent energisation of the SRU, release being effected by a release operation performed by or upon the latching means.

According to one aspect of the present invention, a selector switch, consisting of at least one selective relay unit, in which the armature is operated by current flowing in the winding surrounding the core, is characterised in this, that the said armature is held in its operated condition by residual magnetism and is released by current flowing in said winding in a directon such as to tend to reverse the direction of magnetic flux.

According to another aspect of the present invention, an automatic telecommunication exchange system of the kind in which connecions are established between calling and called lines by way of a connecting circuit provided with at least one selective relay unit which is brought into an operative condition by operating electro-magnetism induced by an operating electric current flowing in one direction in the energising winding thereof, is characterised in this, that the said selective relay unit is held in the operated condition after cessation of the operating electric current by residual magnetism in the core of said unit or induced by a permanent magnet associated with said core acting in the same direction as the operating electro-magnetism, and is released by reduction of said residual magnetism to a value below that capable of holding the said armature, said reduction being effected by a releasing electric current in said energising winding flowing in the direction opposite to the direction of flow of said operating electric current.

Preferably the releasing electric current flows in a circuit which includes a pair of contacts which, as soon as the armature of said selective relay unit is released, are opened by the unit itself thereby to disconnect said releasing electric current immediately said selective relay unit releases so as to prevent reenergisation by said releasing electric current.

In an exemplary exchange system according to the invention, a connecting circuit for connecting calling lines to called lines is provided, at its incoming end (that is the end by which it becomes connected to a calling line), with such selective relay units each having banks or columns of contacts. Also, in the exemplary exchange system, the connecting circuit is provided, at the outgoing end (that is the end by which, under control of a calling subscriber, it becomes connected to a called line), with two such selective relay units each having five columns of contacts.

Although, above, two selective relay units are stipulated at the incoming end and two at the outgoing end of the connecting circuit, there need not be more than one or there may be more than two; this will depend, inter alia, upon the size of the exchange and the density of traffic.

Moreover, the selective relay units may be, as indicated above, constituent parts of a cross-bar switch or its electrical equivalent.

The invention will be described, by way of example, in connection with an exchange system in which each line is provided with four conductors, over two of which the establishment of a connection is initiated and over which, eventually, communication is effected, and over the other two of which the establishment of a desired connection is numerically controlled by a calling subscriber, or over which ringing of a called subscriber's bell is controlled and effected. This provision of each line with four conductors is not a necessary feature of the invention but arises from the fact that it was convenient, in the exchange system for which the invention was made, to provide four conductors.

In the said exemplary exchange system, each bank of contacts comprises eight pairs of contacts, four pairs for each of two lines. One contact of each pair in each of the banks of a selective relay unit is connected (or commoned) to a corresponding contact in all the other pairs.

It is not a necessary condition that each bank of contacts serves two subscribers' lines. Moreover each bank of contacts may serve more than two lines.

As, in the said exemplary exchange system, there are two selective relay units at each end of the connecting circuit, each having five banks of contacts, and as each bank of contacts accommodates two lines, the connecting circuit caters for twenty lines, comprising two groups of ten subscribers' lines each, one group to each selective relay unit. The ten subscribers' lines of each selective relay unit are arranged in two sets of levels, an upper and a lower level, of five lines each.

In order to discriminate between the lines of the two sets of levels the commoned contacts are connected to back and front contacts of a system of change-over contacts. These change-over contacts are operated by change-over relays having this in common with the selective relay units, that is brought into an operative condition by operating electromagnetism induced by an operating electric current flowing in one direction in the energising winding thereof, is (or are) held in the operated condition after cessation of the operating electric current by residual magnetism in the core of said unit or induced by a permanent magnet associated with said core acting in the same direction as the operating electromagnetism, and is released by reduction of said residual magnetism to a value below that capable of holding said armature said reduction being effected by a releasing electric current in said energising winding flowing in the direction opposite to the direction of flow of said operating electric current.

As in the case of the selective relay unit, so in the case of the change-over relay or change-over relays, the circuit in which the releasing electric current flows includes a pair of contacts which are opened by the relay itself when its armature is released.

If each bank of contacts serves more than two subscribers' lines, there may be more than one change-over relay of the kind above specified.

Each line is provided with a line relay and there is provided, common to each sub-group or level of five lines, an auxiliary line relay. These auxiliary line relays are so related, that when any line in a level becomes a calling line, its associated auxiliary line relay becomes operated, provided that no line in any of the other three levels is a calling line. The line relays also control the circuit of a finger magnet so as to interpose a finger between the armature of one or other of the selective relay units at the incoming end of the connecting circuit and the operating bar for that bank of contacts to which the calling line belongs.

The connecting circuit is provided with a self-search relay which, when any one of the four auxiliary line relays is operated, and provided the connecting circuit is not already in use, energises the electro-magnet of one of the two selective relay units at the incoming end of the connecting circuit. Which of the selective relay units shall have its electro-magnet energised depends upon which group of ten lines contains the calling line. The self-search relay also, if necessary, causes energisation of the change-over relay.

As soon as the appropriate selective relay unit operates, it opens the circuit of the self-search relay and the latter releases and opens the energising circuit of the operated selective relay unit and of the change-over relay if operated. The selective relay unit (and the change-over relay if operated) are held in their operated position by residual magnetism. The cut-off relay is energised and the line and auxiliary line relays are released and the operated finger magnet deenergized. The finger which was interposed between the armature of the operated selective relay unit and the operating bar for the relevant bank of contacts is held by being nipped between the said armature and operating bar.

The user of the calling line may now perform certain operations (in the exemplary system under description he may operate one of a number of keys) whereby the first digit of the number of a wanted line is registered on a registering device. The registering device brings about the energisation of finger magnets associated with the selective relay units of a connector, with which the outgoing end of the connecting circuit is provided.

The user of the calling line may now perform further operations whereby the electro-magnet of one or other of the selective relay units of the connector, and if necessary of a change-over relay of the connector, is or are energized. By the conjoint energisation of a finger magnet and selective relay unit of the connector at the outgoing end of the connecting circuit, a connection is established between the connecting circuit and the wanted line. The wanted line is rung over the two extra conductors and the registering device is released. Moreover, a so-called wiper-connector relay operates as a result of the establishment of the said connection. This wiper-connector relay is of the kind which is brought into an operative condition by operating electro-magnetism acting in one direction and induced by an operating electric current flowing in one direction in the energising winding thereof, is held in the operated condition after cessation of the operating electric current by residual magnetism in the core of said relay or induced by a permanent magnet associated with said core acting in the same direction as the operating electro-magnetism, and is released by reduction of said residual magnetism to a value below that capable of holding said armature said reduction being effected by a releasing electric current in said energising winding flowing in the direction opposite to the direction of flow of said operating electric current.

As in the cases of the selective relay unit and of the change-over relay, so in the case of the wiper-connector relay, the circuit in which the releasing electric current flows includes a pair of contacts which are opened by the relay itself when its armature is released.

The circuit over which the electro-magnets of the selective relay unit (and if necessary of the change-over relay) of the connector associated with the outgoing end of the connecting circuit was energised is now broken but the relay is (or these relays are) held in their operative condition by residual magnetism.

As soon as the user of the called line responds to the call a ringing-trip relay, which is also of the kind which is brought into an operative condition by operating electro-magnetism acting in one direction and induced by an operating electric current flowing in one direction in the energising winding thereof, is held in the operated condition after cessation of the operating electric current by residual magnetism in the core of said relay or induced by a permanent magnet associated with said core acting in the same direction as the operating electro-magnetism, and is released by reduction of said residual magnetism to a value below that capable of holding the armature said reduction being effected by a releasing electric current in said energising winding flowing in the direction opposite to the direction of flow of said operating electric current.

Here again, the circuit in which the releasing electric current flows includes a pair of contacts which are opened by the relay itself when its armature is released.

The connecting circuit includes so called A and B feed relays which are held operated, during a conversation, by the loop around the calling and called lines respectively. These two relays and a relay K are the only relays which draw current during the persistence of the connection.

During the persistence of the connection, in addition to the A and B feed relays, only the selective relay units at the incoming and outgoing ends of the connecting circuit and if operated the change-over relay at the incoming or outgoing end or at both ends of the connecting circuit, and the wiper-connector relay remain operated. Except the A and B feed relays, all the relays which remain operated are held operated by residual magnetism.

As soon as the loop around either the calling or called line is broken, the selective relay unit at the corresponding end of the connecting circuit, and, if operated, also the change-over relay, is released, by releasing current flowing in the winding in a direction opposite to that which brought about its original operation. Moreover, when the loop around the called line is so broken, the wiper-connector relay is similarly released.

Provisions are made for giving to the user of the calling line a tone signal to indicate that the wanted line is already busy or a tone indicating that the wanted line is busy called (rung).

If there are more than one connecting circuit, each has a self-search relay and the self-search relays are so interconnected, that only one of them can operate at a time if that one is associated with a connecting circuit not already in use in establishing a connection.

The invention is illustrated in the accompanying drawings of which:

Figure 1 is part of one construction of a selective relay unit to which the invention may be applied and shows the energising winding and two finger magnets with their associated fingers and contact operating member:

Figure 1a is to show more clearly the upper finger magnet of Figure 1;

Figures 2 to 7 together show a connecting circuit incorporating selective relay units at the incoming and outgoing ends, and certain controlling elements;

Figure 8 is a part of a self-searcher associated with a second connecting circuit (which itself is not shown);

Figure 9 is a coding table; and

Figure 10 shows the numbering arrangement of the lines connected to the contacts of a twenty-line selective relay units in the exemplary exchange under description.

Figure 4:
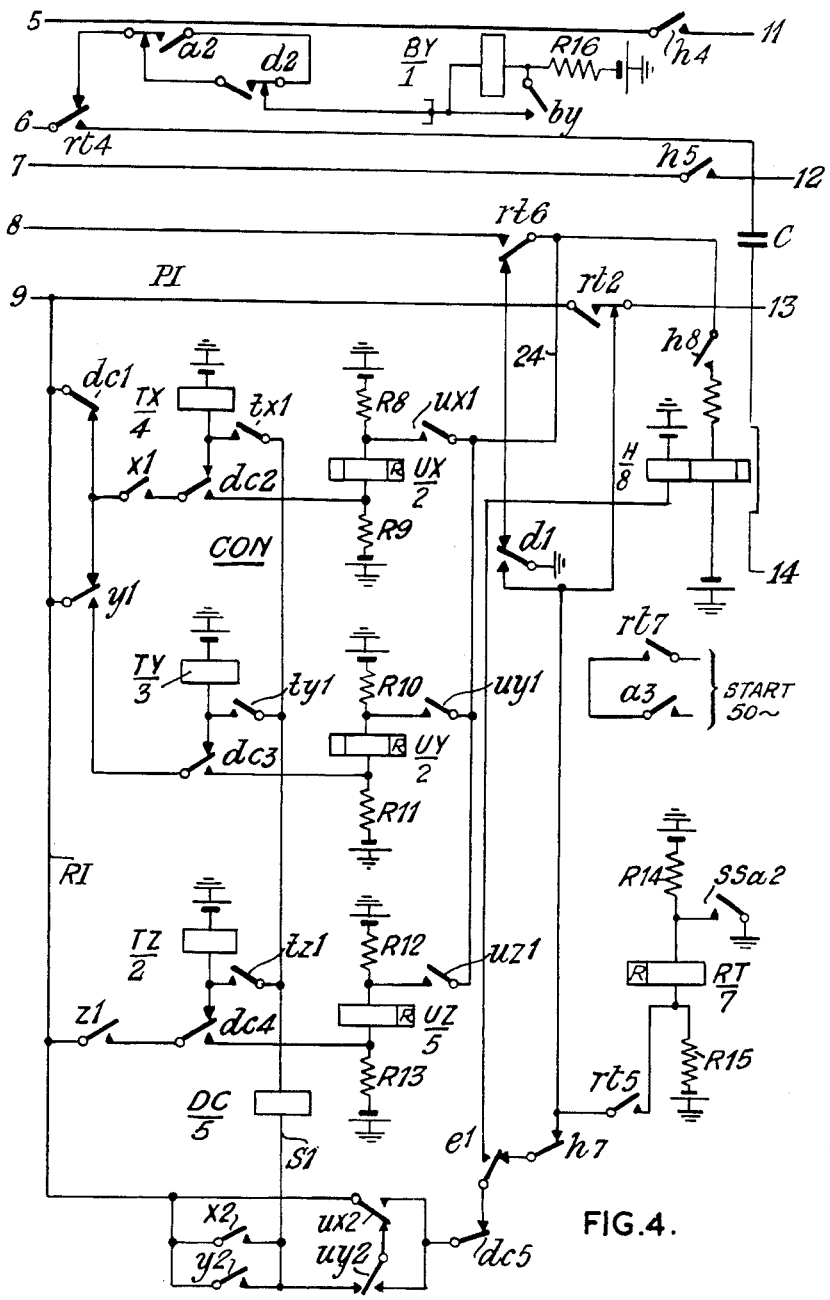
Figure 5:
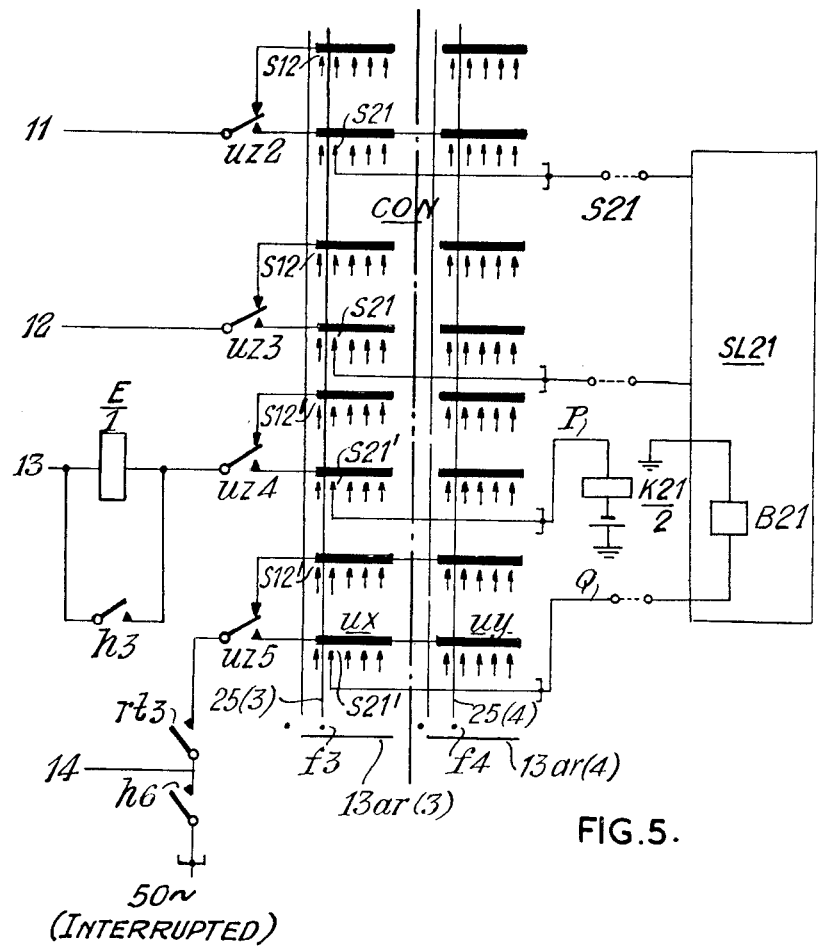

The connecting circuit figures should be placed with Figure 2 to the left of Figure 3, Figure 5 to the right of Figure 4, and Figures 3 and 4 next to each other, correspondingly numbered conductors joining. Figure 7 should be placed below Figure 3 and to the right of Figure 6, with correspondingly numbered conductors joining.

The following conventions are used:

The analytical method of showing the circuit has been used in which relay contacts are shown divorced from their energising windings; energising windings are identified by upper-case references and the associated contacts are identified by the same references in lower case; the numbers under the upper-case references indicate the number of contacts served by the relays and the numbers following the lower-case references identify the several contacts. The contacts in the selective banks of the selective relay units do not follow this system.

In Figure 1 there is shown so much of one construction of a selective relay unit of the kind which is brought to operative condition by operating electro-magnestism acting in one direction and induced by an operating electric current flowing in one direction in the energising winding thereof, is held in the operated condition after cessation of the operating electric current by residual magnetism in the core of said selective relay unit or induced by a permanent magnet associated with said core acting in the same direction as the operating electro-magnetism, and is released by reduction of the residual magnetism to value below that capable of holding the armature by a releasing electric current in said energising winding flowing in the direction opposite to the direction of flow of said operating electric current.

The selective relay unit illustrated comprises, inter alia, a relay of generally well known type. Insofar as Figure 1 illustrates a relay of generally well known type, Figure 1 may be regarded as illustrating other relays (for example change-over relays) to which the invention is applied.

The selective relay unit has an energising winding 12, a core 1, a yoke 11 having a "knife edge" support 11a for an armature 13. The armature is provided with spring biasing means (not shown) for retaining it in a retracted condition, as shown. The core 1 is of hard steel so that when magnetised by current the energising winding, it will retain the magnetic flux after the current is cut off from the energising winding.

If desired, the core may, as an alternative be of soft iron and extend beyond the back cheek 55 of the energising winding as at 1a. This extension may be integral with the core 1 and be "waisted" as shown at 1a and provided with a permanent biasing magnet 12a. This permanent biasing magnet may be associated with the core in much the same manner as a copper slug is associated with the core of a retarded relay. The members enumerated are assembled and supported from a support member not shown. The armature 13 carries a transverse support 15 to which is secured a transverse operating member 17. The support 15 and operating member 17 extend the whole width of the selective relay unit for a purpose to be described hereafter.

The selective relay unit also comprises a finger-magnet assembly, which is likewise carried by the support member (not shown) previously mentioned. The finger-magnet assembly includes an L-shaped support plate 31 which carries all the remaining parts of the said assembly. The plate 31 carries a number, for example 5, of finger-magnets 32, 32a, 32b.

These finger-magnets are arranged in two rows, an upper row of two finger magnets and a lower row of three. In Figure 1 two of the finger-magnets, namely 32 and 32a are shown and in Figure 1a two finger magnets are shown namely 32a (this is the same one as 32a in Figure 1) and 32b. Each finger magnet consists of a core (not shown) and a winding. The magnetic circuit includes the core, the L-shaped plate 31, a pole piece 34 (or 34a or 34b; 34b is not visible) and an armature 33 (or 33a, or 33b; 33b is not visible as it is behind 34a). The pole pieces are so arranged as to make the magnetic circuits substantially the same in each case in spite of the fact that the upper row of finger magnets are further away from the horizontal limb of plate 31 than are the lower ones. This is effected by making the pole pieces of the upper finger magnets, as 34a, of greater length than the pole pieces of the lower ones, as 34. The armatures 33, 33a, 33b . . ., are supported from a plate 36 which is in turn supported by screws, as 37, from the vertical limb of the L-shaped member 31. The means for supporting the armatures from the plate 36 comprises resilient members 35 (or 35a, 35b . . .; 35b is not visible as it is behind 35a). In Figure 1 member 35 is shown in its operated position, that is with the armature 33 drawn into the space between pole pieces 34 and the horizontal limb of the L-shaped member 31. The member 35a, which is associated with the finger magnet 32a is shown in its unoperated position in both Figures 1 and 1a. The members 35 etc. are slightly deformed so as to bias them into the position shown for 35a. Each member 34 etc. and its supporting spring 35 etc. carries a finger 44 (or 44a, or 44b etc.; 44b is not visible as it is behind 44a) each having, at its tip, two upwardly bent lugs 54 (or 54a, or 54b etc.) neither lug 54b is visible and only one of 54 (or 54a) is visible.

The selective relay unit also comprises a spring and contact assembly including contact carrying springs 21 and 22. These contact springs 21 and 22 are carried, by means of insulating spacers 23, from the support member already referred to (not shown). The springs 21 are the so-called fixed springs and the springs 22 are the moving springs the front ends of each of which extend into a slot in an operating bar 25. This operating bar is cut away at its lower end to provide a shoulder 25a. The narrow part of the operating bar 25 passes through an aperture in a plate 27 by which it is supported at the shoulder. The lower part of the narrow extension is cut away to provide a notch at 25c. There are five banks of springs each having its operating bar, and all the operating bars are supported at their upper ends by an upper plate (not shown) having slots through which they extend. Each operating bar is provided with an upper shoulder similar to that shown on the upper end of the narrowed part at 25a but turned the other way up. These shoulders limit the extent of movement of the operating bars.

In operation, one of the finger magnets, for example 32, is energised and, by drawing its associated armature 33 into the air gap, moves its finger 44 and upturned lug 54 into the position shown in Figure 1 in which a pin 45 extending between the two upturned lugs 54 is brought to a position under the lowest part of the operating bar 25. The energising winding 1 of the relay is then energised and, attracting its armature 13, lifts the operating member 17, thereby to raise the lugs 54 of the finger 44. Thus the operating bar 25 is raised so as to close the contacts 21 and 22 in pairs.

In lifting the finger 44 the operating member 17 also lifts other fingers, as 44a, Figure 1a, but by reason of the cut away part 25c of the operating bars associated with the other fingers the other operating bars 25 are not lifted.

The residual magnetism in the core is insufficient to attract the armature 13, but is sufficient to hold it when attracted by the energisation of winding 12, after the energising current in winding 12 is disconnected. To release the armature in spite of the residual magnetism, a deenergising current is caused to flow through the main winding 12 in a direction opposite to that in which the energising current flowed.

An elementary circuit arrangement is shown associated with the relay. The two ends of the main winding 12 are connected through resistances 57 and 59 to the negative terminal of a source of current 61 whose positive terminal is earthed. The left hand end of winding 12 is connected from a point between the said left hand end and resistance 57 through two contacts ss and a in series to earth. The right hand end of winding 12 is connected from a point between the said right hand end and resistance 59 through two contacts mo and a in series to earth. With this circuit arrangement, if contacts ss and a are closed a circuit is completed from earth through the front contact a through contacts ss, winding 12, resistance 59, to the negative terminal of source 61 and hence back to contact a via earth. Hereby the relay 12 is energised with magnetic flux in one direction and will operate and will remain operated after the eventual opening of contacts ss, by reason of the holding magnetism produced by winding 12a, the direction of current from source 55 being correctly chosen for this purpose. When the armature is attracted it closes contacts mo in a manner not shown but indicated by the chain line connecting the armature with the contact mo. If, in these conditions, contact a is returned to the position shown in Figure 1 and contact mo remains closed, a deenergising current will flow from earth by way of the back contact a, closed contacts mo, winding 12 and resistance 57 to the negative terminal of source 61 and hence to contact a via earth. This current flows in the opposite direction to that which brought about the energisation of the relay and therefore tends to destroy the energising magnetism and thus releases the relay. When the relay is released, it opens contact mo so that the deenergising circuit is immediately opened so that the deenergisation current will not be able to operate the armature by reversed magnetisation.

As mechanical cross-bar switches are so well known, it has not been thought necessary to include a description of such herein. It is sufficient to say that an operated finger magnet will operate a selector bar. The operated selector bar will select for operation all the sets of contacts in a column, one of which sets will be operated by an operating magnet corresponding to the relay shown in Figure 1. It is clear that the operating magnet may be held, when energised, by residual magnetism, and released by reversed current.

Referring now to Figures 2 to 7, the circuit connections of a 20-line automatic exchange, using, as line finders and as connectors, selective relay units of the kind already referred to above, will be described.

The circuit diagram of Figs. 2 to 7 illustrates one connecting circuit comprising a line-finder LF (part in Fig. 2 and part in Fig. 3), a connector CON (part in Fig. 4 and part in Fig. 5) and circuit-controlling apparatus and circuit elements shown in these four and the remaining figures.

The line finder comprises two selective relay units, such as that described in connection with Fig. 1 and a change-over relay.

The subscriber's instrument SL12 is connected to the exchange over a four-conductor line, comprising conductors (—), (+), P and Q. Conductors (—) and (+) are the conversation conductors, and conductors P and Q are the signalling conductors over which the subscriber, as a calling subscriber, effects selection of a desired line and, as a called subscriber, is rung. His instrument includes switch-hook contacts sh1 and sh2 included, respectively, in series with conversation conductor (—) and signalling conductor P, the former contacts being normally open and the latter normally closed. It also includes a microphone M, transformer T, receiver R, and a number of signalling keys SK, numbered 1 to 5.

Each of the selective relay units in the line-finder has an energising winding, such as winding 12 of Fig. 1, which in Fig. 3 is given the reference MO or ME respectively. Each of these selective relay units has five banks or columns of contacts which in Fig. 2 are given references (respectively mo and me), arranged in eight levels.

All the fixed contacts (corresponding to contacts 21 of Fig. 1) are connected together, as indicated, in Fig. 2, by the thickened lines, some of which bear reference 21. They are also connected either to front or back contacts ch of a relay CH, later to be referred to. In the top level (the first counting downwards) of contacts, the negative conversational wire (—) of ten different subscriber's lines are connected to the moving contacts, one to each. In the third level of contacts the positive conversational wire (+) of the same ten subscribers' lines are connected to the moving contacts. The negative and positive conversational wires of only one subscriber's line SL12 is shown so connected to moving contacts s12. In the second and fourth levels of contacts, the negative and positive conversational wires of a further ten subscribers' lines are similarly connected. Only one is indicated at s11.

In the fifth and sixth levels, one control wire P of each of the same twenty subscribers' lines is connected to the moving contacts one to each, the other control wire of the same twenty subscribers' lines being connected individually to the moving contacts in the seventh and eighth levels of contacts. The control wires P and Q of the same subscriber's line *s*12 are shown connected to contacts *s*12'. Thus the line finder caters for twenty subscribers' lines in two groups of 10 each. The twenty subscribers' lines are similarly connected to moving contacts in the connector CON (Figure 5). Subscriber SL21 is of interest, and his line is connected to contacts *s*21 and *s*21'.

The change-over relay CH has a number of contacts, four only of which we need yet consider which are given references *ch*1 to *ch*4. These are change-over contacts and serve to select either the ten subscribers' lines in what may be termed the upper group of ten (levels 1, 3, 5, 7) or the ten in what may be termed the lower group of ten (levels 2, 4, 6, 8). A similar relay UZ, having contacts *uz*2 to *uz*5, serves a similar selection at the connector.

The change-over relays are, apart from the fact that they have no finger magnets or fingers, similar to the relay selective unit of Fig. 1 that is they have, each, an energising winding 12 an armature corresponding to 13, and various contacts, but no finger magnets or fingers. They also are held by residual magnetism and released by reversal of current in their windings.

The connector CON is similar to the line finder, and comprises two selective relay units referred to in general as UX and UY having windings UX and UY (Figure 4) and banks of contacts *ux* and *uy*. Like the line finder, it serves twenty subscribers' lines in two groups of ten each, and discrimination between the groups of ten is effected by the change-over relay UZ, having, inter alia, contacts *uz*2 to *uz*5 (Figure 5). Relay UZ is the counterpart of the change-over relay CH in the line finder, and is similarly constituted.

In addition to the relays already referred to (that is MO, ME, CH, UX, UY, UZ) all of which are held by residual magnetism when operated, there is one further relay of this nature, that is relay RT (Figure 4). This relay has no finger magnets or fingers. The operating and releasing circuits of all these relays are similar to that shown, and described in connection with, Figure 1.

Figure 6:
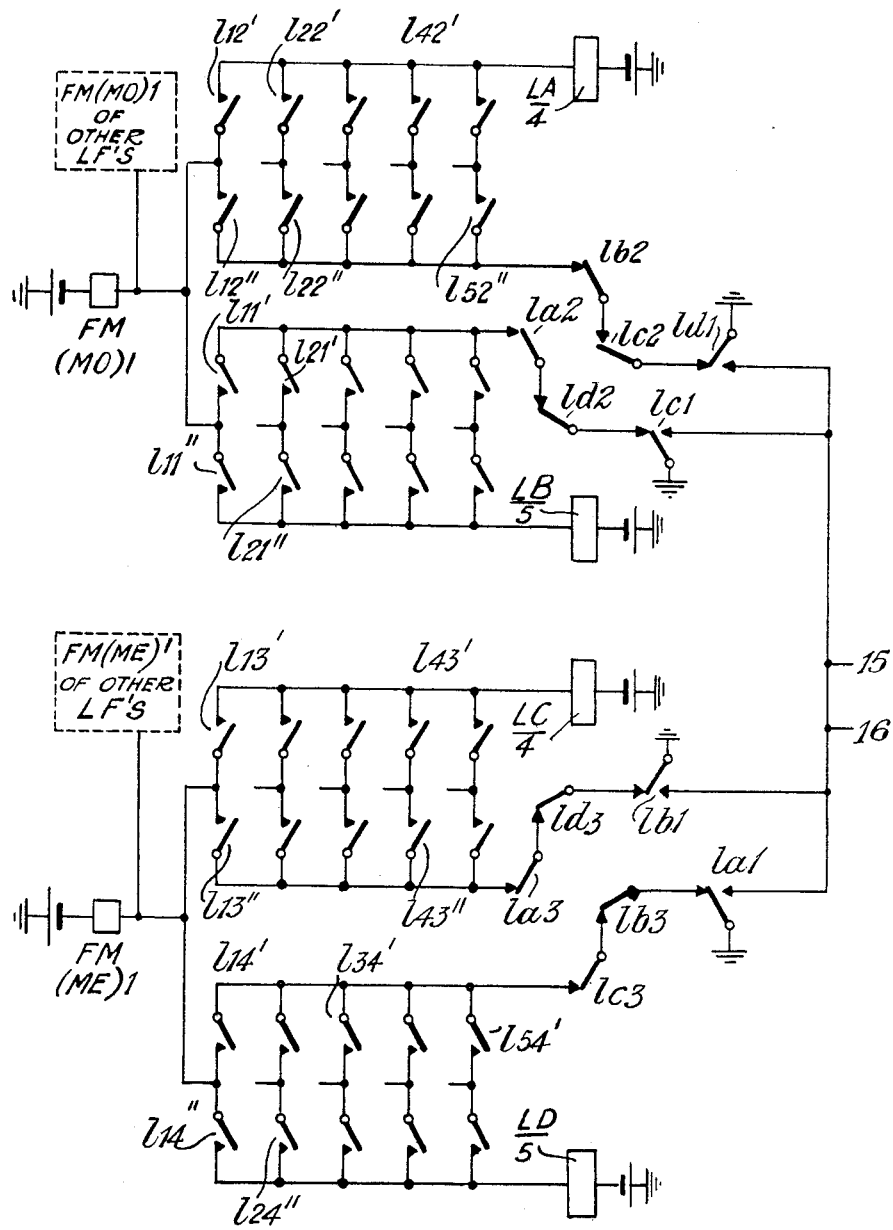

In Figure 6 there are shown two finger magnets FM(MO)1 and FM(ME)1. Finger magnet FM(MO)1 is one finger magnet of five with which selective relay unit MO of LF is provided. The other four are not individually shown. Finger magnet FM(ME)1 is similarly one of five with which selective relay unit ME of LF is provided. The other four are not individually shown: they belong to other line finders.

In Figure 7 there are shown a number of finger magnets FM(UX) and FM(UY) connected in pairs. Three finger magnets FM(UX) are shown and are individually identified as 1, 2 and 5. Also three finger magnets FM(UY) are shown and are individually identified as 1, 2 and 5. Two further pairs of finger magnets FM(UX) and FM(UY) would be provided in a twenty line exchange and would be identified as 3 and 4. They would be connected where indicated. The finger magnets FM(UX) and FM(UY) shown are three of the five finger magnets belonging to the selective relay units UX and UY of the connector CON shown in Figure 5. If there were a second connector, there would be further pairs of selective relay units FM(UX) and FM(UY) connected in parallel with the pairs already shown or referred to.

Each subscriber's line is provided with a line relay L12 (Figure 2) and each group of five subscribers' lines is provided with an auxiliary line relay as LA, LB, LC, or LD respectively (Figure 6), the latter four relays being provided with contacts by which they mutually interfere with each others circuits (as contacts *lb*2, *lc*2 and *ld*1 for relay LA) so as to prevent simultaneous operation of any two of them: they are controlled by contacts (as contacts *l*12', *l*12" for relay LA) of the subscribers' line relays (as line relay L12). Each subscriber's line is also provided with a cut-off relay as K12 (Figure 2).

Two relays, respectively SSA (Figure 7) and SSB (Figure 8) constitute a self-searcher which assigns to a calling line one or other of two connecting circuits similar to that shown in the drawing. Of these two relays, relay SSA assigns the connecting circuit shown, and relay SSB assigns the next connecting circuit (not shown).

Figure 7 shows a numerical selector comprising relays X, Y and Z and Figure 4 shows a register comprising relays TX, TY and TZ (whose contacts are shown in Figure 7), and the selective relay units UX, UY, and UZ already mentioned.

The operation of the circuit is as follows, on the assumption that the subscriber, whose line is indicated at SL12 in Figure 2, is calling for a connection to a subscriber, whose line is indicated at SL21 in Figure 5.

When subscriber SL12 removes his hand-microphone (represented by receiver R and microphone M) from the switchhook, contacts *sh*1 are thereby closed and contacts *sh*2 are opened. By reason of the closure of contacts *sh*1, a circuit is completed for relay L12, via contacts *k*1 and *k*2 of a relay K12 (later to be noticed). Relay L12 operates, and, assuming that no subscriber is calling in any other group, closes a circuit for relay LA (Figure 6) this circuit being from earth by way of unoperated contacts *ld*1, *lc*2, and *lb*2 of relays LD, LC, and LB, and contacts *l*12" and *l*12' of line relay L12. Relay LA, which has four contacts, operates and at its contacts *la*1, *la*2, *la*3, opens the circuits of relays LD, LB, and LC respectively. (Relays LD, LB, and LC are relays having similar function to relay LA, but serve the fourth, second, and third groups of five subscribers lines.) Relay L12 also closes at contacts *l*12" (Figure 6) circuit for finger magnet FM(MO)1 which is the finger magnet for operating finger *f*1 of the first bank or column of contacts of the group *mo* (Figure 2) and for other finger magnets (not individually shown) for the corresponding banks or columns of contacts in other line-finders (not shown).

Relay LA, at its contacts *la*1, in addition to opening the circuit of relay LD, closes a circuit for self-searcher relay SSA (Figure 7), it being assumed that the connecting circuit shown is not otherwise engaged. (Had the connecting circuit shown been already engaged, the circuit for relay SSA would have been already open at one of the contacts *mo*1, *me*1, or *h*1.) Relay SSA at its contact *ssa*1 opens the circuit of relays, such as SSB, similar to SSA but belonging to other connecting circuits. Relay SSA at its contact *ssa*7 (Figure 3), closes a circuit for relay A which operates (relay A is the calling line feed relay). Relay A and relay SSA close, at their contacts *a*1 and *ssa*6 a circuit, via contacts *la*4 and *ssa*3 (Figure 3), through the winding MO and resistance R1, for selective relay unit MO. Relay SSA at its contact *ssa*2 (Figure 4) closes a circuit from earth, through the winding of relay RT, and resistance R15. Relay RT operates.

Selective relay unit MO of the line-finder shown also operates and, since finger magnet FM(MO)1 is energised and a finger *f*1 is interposed between operating bar 25, Figure 2, and the armature 13*ar*1 of the unit, the left hand column of contacts *mo* are thereby closed. (So as not to confuse the drawing, only one operating bar 25 and only one finger *f*1 are shown. It is understood, of course, that there are five of each of these elements for each selective relay unit MO and ME.)

By the operation of the contacts in the left-hand column *mo* of selective relay unit MO, the conversation conductors (—) and (+) of subscriber's line SL12 are extended to relay A, which is thereby held independently of contacts *ssa*7. Also, by the operation of the contacts in the left-hand column *mo*, the private conductor 3 is connected to cut-off relay K12, which is operated by earth at contact *a*1 (Figure 3). The subscriber's signalling conductor Q is connected at contact s12' to selector relays X, Y, and Z via operated contacts rt1 (Figure 7) and back contacts h2 of a through-connecting relay H.

By the operation of relay K12, the circuit of relay L12 is opened, and relay L12 releases. By the release of relay L12, the circuits of relay LA and of finger magnet FM(MO)1 are opened and this relay and that finger magnet release. Although the finger magnet releases, the contacts in the left-hand column of contacts of selective relay unit MO remain operated, because finger f1 is gripped between armature 13ar1 and operating bar 25.

Relay LA, when it releases, opens the circuit of self-searcher relay SSA and this latter relay releases.

Relay SSA, when it releases, reprepares the circuit of subsequent relays (SSB etc.) of the self-searcher, and at contact ssa7 opens the original operating circuits of relay A, which, however, is still held over the calling subscriber's loop, and of selective relay unit MO and of relay RT. Selective relay unit MO and relay RT, however, do not release as they are held in operated condition by residual magnetism (as already described).

The connection, as thus far established, is maintained in dependence upon relay A, that is in dependence upon the maintenance of a loop around the calling subscriber's line.

For the further description of the circuit, it will be assumed that the calling subscriber desires a connection to line SL21 to which end he first momentarily presses key 2, and then key 1, of keys SK.

When key 2 is pressed, a circuit is completed for relay X, traceable from earth, via resistance R7 (Figure 2), key 2, rectifier RF(+)1, signalling conductor Q, contacts s12' of the left-hand column mo in the seventh bank, back contacts ch4, internal conductor QI (Figures 2, 3, and 7), contacts rt1 (operated) and h2 at rest, left-hand winding of relay Z and winding of relay X in series, rectifier RF(+)2, to a source of 50 C./S. alternating current, the positive half cycles passing through the two rectifiers in their pass direction.

Relay X alone operates (relay Z cannot operate in series with resistance R7), relay X, at contact x1 (Figure 4) closing a circuit traceable from earth at front contact a1, via internal conductor PI, back contact dc1 (Figure 4) of a digit control relay DC, front contact x1, and back contact dc2, for tens relay TX.

As soon as the calling subscriber releases key 2, relay X releases and, at contact x1, removes a short circuit from across relay DC, which energises in a circuit traceable from earth on internal conductor PI via conductor RI, back contacts ux2 and uy2 in series, conductor SI, winding of relay DC, contact tx1, and the winding of relay TX to negative: relay TX holds and relay DC operates in this circuit.

Relay DC, which operates in the above described holding circuit, at its contacts dc1, dc2, dc3, and dc4 cuts the operating circuits for relays TX, TY and TZ, so as to remove these relays from further control by the selector relays X, Y, and Z.

Relay TX in addition to closing its own holding circuit, and the operating circuit for relay DC, closes, at contacts tx2 (Figure 7) a circuit for finger magnets FM(UX)2 and FM(UY)2.

Finger magnets FM(UX)2 and FM(UY)2 are respectively the finger magnets for the second columns from the left of contacts ux and for the second column from the left of contacts uy of selective relay units UX and UY, Figure 5. Finger magnets FM(UX)2 and FM(UY)2 operate, respectively, upon fingers f3 and f4, these being the fingers associated with the second columns of contacts of selective relay units UX and UY respectively, so as to interpose these fingers, respectively, between operating bars 25(3) and 25(4) and armature 13ar(3), and armature 13ar4, respectively.

(Other finger magnets FM(UX)2 and FM(UY)2, not shown, but similar to those shown are connected in parallel to those shown, and operate upon fingers, similar to fingers f3 and f4, of other connectors.)

The selecting operations thus far effected have determined that one of four lines is required. Referring to Figure 10, these four lines are 21, 22, 23 and 24. Selection of a particular one of these lines is effected in response to the second operation of one of the keys SK. Remembering that the desired line is SL21 (21 in Figure 10), the calling subscriber SL12 momentarily closes key 1. Hereby an operating circuit is closed for relays X and Y, traceable from earth, via key 1 (Figure 2) rectifier RF(+)1, signalling conductor Q, contacts s12' of selective relay MO, back contacts ch4, internal conductor QI, contacts rt1 and h2, Figure 7, left-hand winding of relay Z, and winding of relay X, rectifier RF(+)2, to the source of 50 C./S. source of alternating current. (This circuit will be recognised as the same as that over which the previous digit 2 was selected except that it does not include resistance R7, Figure 2.) In this circuit relays X and Z operate relay Z being able to operate in the absence of resistance R7.

Relay X, at contact x1 (Figure 4), closes a circuit for selective relay unit UX, traceable from earth on internal conductor PI via back contact y1, front contacts x1 and dc2, winding UX of selective relay unit UX, resistance R8 to negative.

Relay Z, at contact z1, closes a circuit, traceable from earth on internal conductor PI, via conductor R1, front contacts z1 and dc4, winding UZ, resistance R12 to negative, for relay UZ.

Selective relay UX operates its armature 13ar(3), and since finger f3 is interposed between this armature 13ar(3) and operating bar 25(3), all the contacts ux in the second column are operated. Since relay UZ is operated, line SL21 is selected. (Although all the contacts in the second column ux are closed, line 22 is not selected because it is cut off at the back contact uz2 to uz5. Lines 23 and 24 are not selected because selective relay unit UY has not been operated and its armature 13ar(4) is not attracted.)

As soon as selective relay unit UX operates it, at its contacts ux2 (Figure 4) opens the circuit of relay DC and also the holding circuit of relay TX. (Note, this circuit is maintained over contacts x2 of relay X, until the calling subscriber releases key 1.) Relay DC releases.

When selective relay UX operated, and closed the contacts in the second column ux, a circuit was completed, assuming line S21 not to be engaged, from earth at front contact a, via the interval conductor PI of the connecting circuit, front contact rt2 (Figure 4), winding of engaged test relay E (Figure 5), the relevant contact ux, P wire of the called line and the winding of relay K21, which latter is the cut-off relay of line SL21, to negative.

Relay E operates in the circuit just traced (and it may be that relay K21 operates). As a result of the operation of contacts ux2 (Figure 4) and of the resulting release of relay DC and subsequent operation of relay E, a circuit is closed from earth at the front contact a1 (Figure 3), via internal conductors PI and RI, front contact ux2, back contact dc5, front contact e1 and the left-hand winding of relay H, to negative. Relay H operates in this circuit and, at contact h6 (Figure 5), connects 50-cycle interrupted ringing tone to the bell B21 of the called subscriber's instrument. This circuit can be traced via contact rt3, front contact uz5, and the appropriate contact s21' of ux, through bell B21, to earth. Ringing tone is given to the calling subscriber inductively in a circuit which can be traced from 50-cycle interrupted current, via contact h6, conductor 14, condenser C, front contact rt4, conductor 6, and the inductive winding IW of relay D. Relay H also at contact h3 places a short circuit across the winding of relay E so as to ensure the operation of relay K21. At contacts h4 and h5, relay D, which is the called line feed relay, is connected to the transmission line of subscriber SL21.

As soon as the called subscriber SL21 answers, a circuit is completed over his loop for relay D which operates and closes a releasing circuit for relay RT. This can be traced from earth, via the front contact $d1$ (Figure 4), contact $rt5$, through the winding of relay RT and resistance R14 to negative. Current in the winding of relay RT is now in the opposite direction to that responsible for the original operation of relay RT which was from earth, via contact $ssa2$, the winding of relay RT, resistance R15, to negative. Hereby relay RT is released and, at contact $rt3$ (Figure 5), removes ringing current from the called subscriber and at contact $rt4$ (Figure 4) removes ringing tone from the calling subscriber. At back contact $rt2$, a holding circuit, from earth at front contact $d1$, is closed for relay K21.

Had the called line been busy, relay E would not have operated since there would already have been earth potential at the P conductor and the called line. As a result relay H would have been unable to operate and relay RT would have been released in a circuit traceable from earth via contact $a1$ (Figure 3), internal conductors PI and RI, front contact $ux2$, back contacts $dc5$, $e1$, and $h7$, and front contact $rt5$. Under these conditions self-interrupter BY would operate in a circuit from earth through the inductance winding IW, of relay D, via back contact $rt4$, front contact $a2$, back contact $d2$, self-interrupter BY resistance R16. Interrupter BY, at its contact $by$, short-circuits its own winding, releases, reoperates and so on, hereby connecting busy tone to the calling subscriber.

If, at the end of the conversation the calling subscriber hangs up first, a circuit for releasing selective relay unit MO is completed. This is traceable from earth, via back contact $a1$ (Figure 3), front contact $mo2$ winding MO of selective relay unit MO and resistance R2 to negative. Current in this circuit tends to reverse the magnetism in the core of unit MO, so that this unit releases and immediately the deenergising circuit is opened at contact $mo1$.

As soon as the called subscriber hangs up, relay D releases, and at contact $d1$ (Figure 4), closes circuits for releasing selective relay unit UX and relay UZ. These circuits are traceable from earth via back contact $d1$, back contact $rt6$, conductor 24, then via front contact $ux1$, winding of unit UX, resistance R9 to negative for selective relay unit UX, and via front contact $uz1$, winding UZ, resistance R13, to negative. The magnetism in the core of selective relay unit UX and of relay UZ is reduced and the unit, and relay release, immediately opening their respective deenergising circuits at contacts $ux1$ and $uz1$.

In Figure 9 is given a table showing the combination of relays (X, Y, Z) which is energised in response to the operation of different keys, 1 to 5, and in Figure 10 is given the line numbering arrangement. It has already been shown that the result of operating key 2 for a first digit, is to operate relay X, followed by the operation of relay TX, and that, as a consequence, connector finger magnets FM(UX)2 and FM(UY)2 were operated. One of the four lines 21, 22, 23, or 24, depending upon the value of the second digit, was hereby selected.

The result of the operation of key 1, for a first digit, is to operate relays X and Z. The effect of the operation of relays X and Z is to operate relays TX and TZ and, as a consequence, connector finger magnets FM(UX)1 and FM(UY)1 (Figure 7) are operated via front contact $tz2$, a back contact $ty3$, front contact $tx3$, and the windings of finger magnets FM(UX)1 and FM(UY)1. One of the four lines 11, 12, 13, or 14, depending upon the value of the second digit, is hereby selected.

The result of the operation of key 3, for a first digit is to operate relay Y alone. Discrimination between relays X and Y in effect by the poling of rectifiers RF(+)1 and RF(+)2 in the circuit of relay X and RF–1 and RF–2 in the circuit of relay Y. The operation of relay Y results in the operation of relay TY and consequent operation of finger magnets FM(UX)3 and FM(UY)3 (not shown) via back contacts $tz2$ and front contacts $ty2$. Hence one of the four lines 31, 32, 33, or 34, is selected.

Operation of key 4 brings about the operation of relays Z and Y, and consequent operation of relays TX and TY and, via operated contacts $tz2$ and $ty3$, and back contact $tx4$ for finger magnets FM(UX)4 and FM(UY)4 (not shown). Hence one of the lines 41, 42, 43, or 44, is selected, depending upon the value of the second digit.

Operation of key 5 brings about the operation of relays Z, X, and Y. This is effected as follows: Current flows on positive half-cycles of A. C. through the left-hand winding of relay Z and the winding of relay X via rectifier RF(+)2, the right-hand winding of Z the winding of relay Y being short circuited by rectifier RF+3, and on negative half-cycles through the right-hand winding of relay Z and the winding of relay Y, the left-hand winding of relay Z and the winding of relay X being now short-circuited by rectifier RF—3. As a result of the operation of relays X, Y and Z, relays TX, TY, and TZ operate resulting in the operation of finger magnets FM(UX)5 and FM(UY)5. Consequently one of the lines 51, 52, 53, or 54, depending upon the value of second digit, is selected.

Had the calling line been one of those involving the operation of the contacts $ch1$ to $ch4$, one of the auxiliary line relays LB or LD (instead of auxiliary line relay LA) would have been operated: for example, if the calling line had been SL11 (instead of SL12), relay L11 (not shown but corresponding to L12) would have operated, and at its contacts $l11'$ and $l11''$ a circuit would have been closed for auxiliary line relay LB. This circuit is traceable from earth via back contacts $lc1$, $ld2$, $la2$, front contacts $l21'$ and $l21''$. Consequently, when relay A operated in the manner described, a circuit would have been closed for relay CH, in addition to that for selective relay MO. This circuit is traceable from earth, via front contacts $a1$ (Figure 3), $ssa5$, $lb5$ and $ssa5$, through the winding CH of biased relay CH and resistance R5 to negative. Biased relay CH would have operated, and would have held by biasing or residual magnetism.

Relay CH is ultimately, that is when line 11 clears, released by reduction of the residual magnetism, by current in the reverse direction through winding CH. The circuit for this is from earth, via back contact $a1$, front contact $ch1$, winding CH, resistance R6, to negative. As soon as biased relay CH releases, it opens contact $ch5$ thereby to prevent the relay from being reenergized.

Thus, it will be seen, that an automatic exchange system has been devised in which connections are established between calling and called lines by means of selective relay units (as MO, ME, UX, and UY) and change over relays (as CH and UZ) which are operated by current in one direction through their windings, are held by residual magnetism, and are released by current in the opposite direction through these windings. Moreover, except for the A and B feed relays (A and D), only one relay (H) which is held during the existence of the connection is held otherwise than by residual magnetism. One relay (RT) which is required to be held during the whole process of establishing the connection is also of the kind which is operated by current in one direction and released by current in the reverse direction and held by residual magnetism. Thus there results a reduction to a minimum of the demand upon the locally provided source of current, a very desirable consideration in the case of remote unattended exchanges.

At the middle right-hand side of Figure 4 are shown two contacts $a3$ and $rt7$. These contacts are closed by relays A and RT and are in the starting circuit for a generator for the 50 cycle alternating current used for operating the register (relays X, Y, and Z) and for ringing purposes.

I claim:

1. In an automatic telecommunication system, a connecting circuit having a line-finder switching device and a connector switching device for connecting calling lines to called lines, wherein at least one of said switching devices comprises a selective relay unit consisting of an electro-magnetic relay having an energising winding, a core, an armature, a plurality of columns of contacts, a like plurality of operating bars one for each column of contacts, a like plurality of fingers one for each operating bar, a like plurality of finger magnets each associated with one of said fingers, said connecting circuit also having means for selectively energising one finger magnet dependent upon which line is to be connected to said connecting circuit, said finger magnet when energised interposing its finger between said armature and the associated operating bar, means for thereafter applying operating current in one direction to said electro-magnetic energising winding to operate said armature so as to lift said associated operating bar, means controlled by said connecting circuit when said electro-magnetic relay is operated for disconnecting said operating current, means including said core providing residual magnetism for holding said relay operated when said operating current is disconnected, and means controlled by a connected line for applying to said energising winding a releasing current in a direction opposite to the direction of flow of said energising current for reducing said residual magnetism to a value below that capable of holding said armature so as to release said line from said connecting circuit.

2. A system according to claim 1, wherein said means controlled by said connected line for applying said releasing current includes a source of direct releasing current, a first pair of contacts closed by said selective relay unit when operated, a second pair of contacts controlled by said line when connected, a releasing circuit connecting said source of direct releasing current through said first and second pairs of contacts to said energising winding, said first pair of contacts opening said releasing circuit upon deenergisation of said electro-magnetic relay thereby to prevent releasing current reenergizing said electro-magnetic relay.

3. A system according to claim 2, wherein said means providing said residual magnetism includes a core of high retentivity for said electro-magnetic relay.

4. A system according to claim 2, wherein said electro-magnetic relay is provided with a core and wherein said means providing said residual magnetism includes direct physical contact between said armature and said core.

5. A system according to claim 2, wherein said electro-magnetic relay is provided with a core and wherein said means providing said residual magnetism includes a permanent magnet for magnetizing said core.

6. A system according to claim 1 wherein a plurality of lines is connected to each column of contacts of said selective relay unit, and wherein said connecting circuit includes at least one change-over relay said change-over relay having an energising winding, a core, and change-over contacts for selecting one of said plurality of lines, said connecting circuit including means for applying operating current to said energising winding to operate said change-over relay when one of said plurality of lines is to be connected to said connecting circuit, means controlled by said connecting circuit when said line is connected to said connecting circuit for disconnecting said operating current, means including said core providing residual magnetism for holding said change-over relay operated when said operating current is disconnected, and means controlled by a connected line for applying to said energising winding a releasing current in a direction opposite to the direction of flow of said energising current for reducing said residual magnetism to a value below that capable of holding the armature of said changeover relay so as to release said line from said connecting circuit.

7. A system according to claim 6, wherein said means controlled by said connected line for applying said releasing current includes a source of direct releasing current, a first pair of contacts closed by said change-over relay when operated, a second pair of contacts controlled by said line when connected, a releasing circuit connecting said source of direct releasing current through said first and second pairs of contacts to said energising winding, said first pair of contacts opening said releasing circuit upon deenergisation of said electro-magnetic relay thereby to prevent releasing current reenergising said electro-magnetic relay.

8. A system according to claim 7, wherein said means providing said residual magnetism includes a core of high retentivity for said electro-magnetic relay.

9. A system according to claim 7, wherein said change-over relay is provided with a core and wherein said means providing said residual magnetism includes direct physical contact between said armature and said core.

10. A system according to claim 7, wherein said change-over relay holding is provided with a core and wherein said means providing said residual magnetism includes a permanent magnet for magnetizing said core.

11. A system according to claim 1, including a calling subscriber's line, a called subscriber's line, said connecting circuit, a source of direct current, a ringing trip relay having an energising winding, an armature, and a core, means operated upon said connecting circuit being taken into use by said calling subscriber's line for connecting said source of direct current to said energising winding of said ringing trip relay to cause current to flow from said source in said winding in one direction thereby to energise said ringing trip relay, means operated upon establishment of said connection of said calling line to said connecting circuit for disconnecting said source of current from said winding, a source including said core of residual magnetism for holding said relay upon said disconnection, and means operated upon response of the called subscriber after connection of said connecting circuit to said called line for connecting said source of direct current to said winding of said ringing trip relay to cause current to flow in said winding from said source in the other direction to reduce said residual magnetism to a value below that capable of holding said armature thereby to release said ringing trip relay.

12. A system according to claim 11, wherein said means for connecting said direct current to said winding to cause current to flow therein in said reverse direction includes a pair of relay contacts operated upon said response of said called subscriber, a normally open pair of contacts on said ringing trip relay, and a circuit connecting said relay contacts, said normally open contacts, said source of direct current, and said winding in series said normally open-contacts preventing reenergisation of said ringing trip relay by current from said source in said other direction.

13. A system according to claim 11, wherein said means providing said residual magnetism includes a core of high retentivity for said electromagnetic relay.

14. A system according to claim 11, wherein said ringing trip relay holding is provided with a core and wherein said means providing said residual magnetism includes a permanent magnet for magnetizing said core.

15. In an automatic telephone exchange system, a calling subscriber's line, a connecting circuit, and a line finder having a plurality of columns of contacts, a plurality of selector bars, a plurality of fingers, a plurality of finger magnets for operating said fingers, and at least one operating relay for operating upon a bank of contacts selected by one of said selector bars, wherein said operating relay has an armature, a core and an operating winding, said system including a source of direct current, means controlled by said calling subscriber's line for connecting said source of direct current to said winding thereby to energise said operating relay, means controlled by said operating relay when energised for disconnecting said winding from said source of direct current, a source of residual magnetism including said core for holding said armature after said disconnection, and means controlled by said calling subscriber for connecting said winding in reversed direction to said source of direct current thereby to reduce said residual magnetism to a value below that at which said core can hold said armature.

16. A system according to claim 15 wherein said means providing said residual magnetism includes a hard steel core for said operating relay.

17. A system according to claim 15 wherein said operating relay includes a core and said source of residual magnetism includes a permanent magnet for magnetizing said core.

18. In an automatic telephone exchange system, a calling subscriber's line, a connecting circuit, a called line, and a selector switch for connecting said connecting circuit to said called line under control of said calling subscriber's line, wherein said selector switch includes selector bars and operating bars, finger magnets for selecting selector bars under control of said calling subscriber's lines, and electromagnetic relays for actuating said operating bars, said electromagnetic relays having an armature, a core, and a winding for said core, said system including a source of direct current, means controlled from said calling subscriber's line for connecting said source of direct current to said winding to cause current to flow in said winding in one direction, means for disconnecting said source of current from said winding upon energisation of said electromagnetic relay, means including said core for providing residual magnetism for holding said electromagnetic relay operated upon disconnection of said source of direct current from said winding, and means controlled by said called subscriber for connecting said source of direct current to said winding to cause current to flow therein in the opposite direction thereby to reduce said residual magnetism to a value below which said core is able to hold said armature.

19. In an automatic telephone exchange system, a cross-bar switch including operating electromagnets each said operating electromagnet including an armature, a first contact operated by said armature, a second contact operated by said armature, a core, and an energising winding, said system including a source of direct current, means including said first contact for connecting said source of direct current to said winding to cause current to flow therein in one direction, said contact disconnecting said source of direct current from said winding when said armature is attracted, means including said core for providing residual magnetism therein for holding said armature attracted, means including said second contact for connecting said source of direct current to said winding to cause current to flow therein in the opposite direction to said one direction thereby to reduce said residual magnetism to a value below that at which said core can hold said armature.

20. A system according to claim 19 wherein said second contact disconnects said source of direct current from said winding immediately upon release of said armature thereby to prevent said armature from being reattracted by magnetic flux built up by said current in said opposite direction.

21. A system according to claim 19, wherein said means for providing said residual magnetism includes a hard steel core.

No references cited.